June 22, 1965
D. ARBITMAN ETAL
3,190,505
LIQUID DISPENSING
Filed Oct. 15, 1962
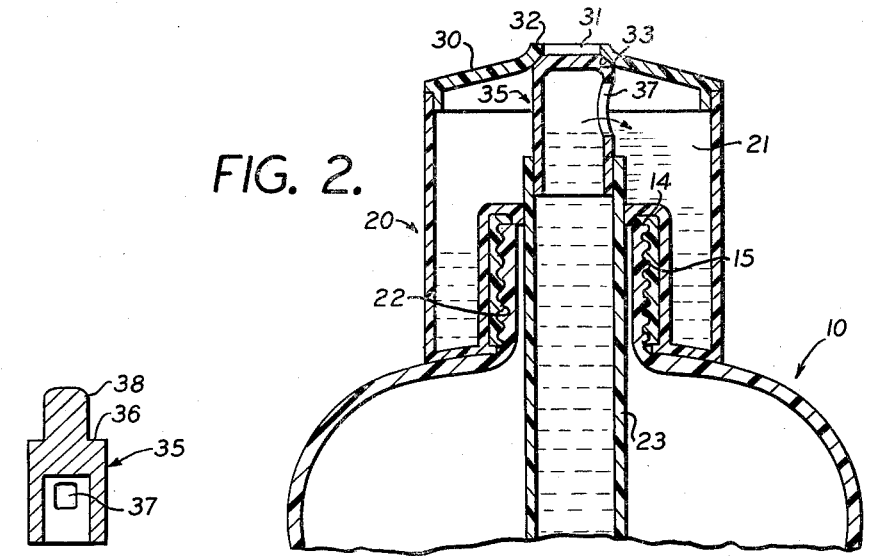
FIG. 2.
FIG. 3.
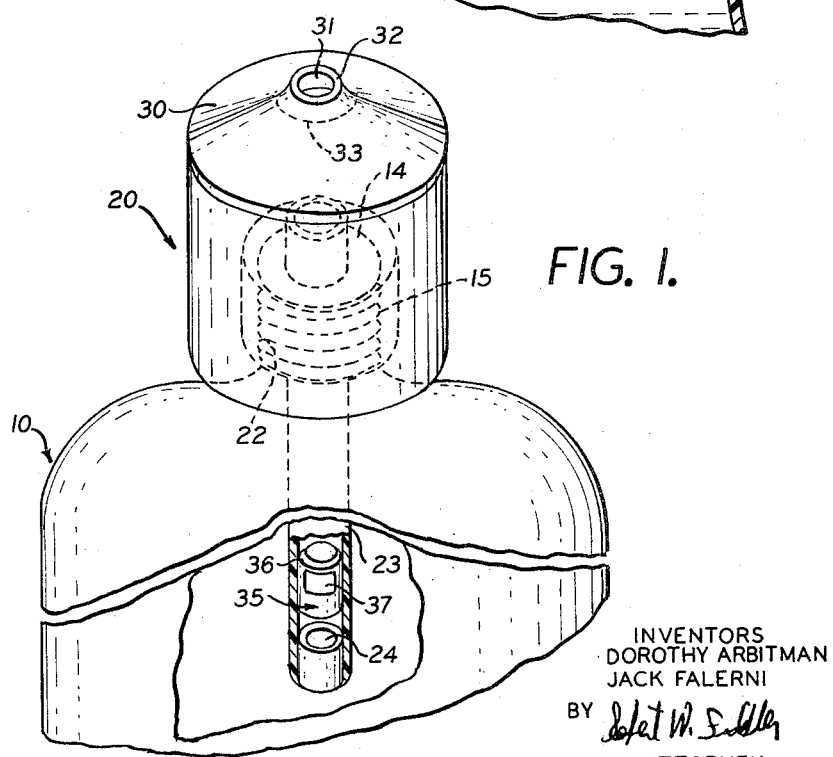
FIG. 1.
INVENTORS
DOROTHY ARBITMAN
JACK FALERNI
BY
ATTORNEY.

United States Patent Office

3,190,505
Patented June 22, 1965

1

3,190,505
LIQUID DISPENSING
Dorothy Arbitman, 2150 Wallace Ave., and Jack Falerni, 2555 Cruger Ave., Bronx, N.Y.
Filed Oct. 15, 1962, Ser. No. 230,605
4 Claims. (Cl. 222—207)

This invention relates to dispensing, more particularly, to means implementing the discharge of a desired metered quantity of fluid from a container.

Contemporary technological developments have given rise to the widespread utilization of plastics in the fabrication of liquid containers. In addition to providing for a relatively unbreakable container, the use of plastics in the fabrication of these containers also permits the formation of a so-called "squeeze bottle," enabling the user to dispense from the container any fluid contained therein, merely by the application of pressure to the sidewalls of the container.

With many of the fluids packaged in the so-called "squeeze bottle" type of container, the quantities of fluid discharged must be carefully controlled to provide for effective utilization of the fluid. This is necessary to prevent waste where the value of the fluid is relatively high, or to prevent undesired results where a specific quantity of fluid must be provided to obtain a given desired result. In order to provide for the dispensing of desired quantities of liquids, a variety of metering devices have been evolved for utilization in conjunction with these "squeeze bottle" types of containers. None, however, have heretofore proven commercially feasible due to the complexity of their structure, which results in an increase of production costs, making their utilization in conjunction with the normal container economically impractical. Other problems present in heretofore known dispensing or metering devices, suitable for use in conjunction with plastic containers, arise in connection with the limited range of the quantities of fluid subject to being dispensed by the metering device.

It is with the above problems and desiderata in mind, that the present means, including both method and apparatus have been evolved. The novel means here provided permit dispensing of a desired metered quantity of fluid from a liquid container in which the metering dispensing means may readily be embodied in conjunction with containers of a relatively wide range of capacity. The novel means serve further to permit embodiment in conjunction with a container which is relatively economical of fabrication and maintenance.

It is accordingly among the primary objects of this invention to provide an improved means for dispensing a desired metered quantity of fluid from a "squeeze bottle" type of container.

It is also an object of the invention to provide an improved metering valve member having fluid passages which may be dimensioned of a capacity such as to prevent clogging thereof by the fluids being handled.

A further object of the invention is to provide an improved metering valve of a construction subject to efficient economical assembly.

Another object of the invention is to provide simple metering means which may be employed in conjunction with any standard type liquid containing squeeze bottle.

These and other objects of the invention which will be made hereafter more apparent are achieved by provision of a novel fluid dispenser in the form of a metering and dispensing bottle cap assembly designed to be substituted for the cap of a conventional screw type neck of a liquid containing squeeze bottle. It will be understood by those skilled in the art that though the invention is here disclosed as having particular utility in conjunction with a squeeze bottle, any container having a flexible wall or any means by which pressure within the container may be increased, may be utilized. The novel dispenser is formed with a metering chamber preferably cylindrical in configuration confining a desired quantity of fluid to be dispensed. At the lower end the chamber is provided with a collar internally threaded to accommodate the screw neck of the container. The container which as noted is of a squeeze bottle type serves as a fluid supply. Extending downwardly from the metering chamber into the fluid supply reservoir is a fluid conducting conduit in the form of a hollow tube having its lower end constricted to form a retaining lip, but open to the fluid supply. The upper end of the fluid conduit is open to the metering chamber. Mounted within the conduit is a Cartesian diver valve in the form of a cylinder having an open lower end and closed upper end with a discharge orifice formed in the sidewall of the valve. The Cartesian diver valve is of an external diameter substantially equal to the internal diameter of the fluid conduit, whereby the diver valve may move freely within the conduit, but any fluids passing through the conduit will be restrained from bypassing the valve. At the upper end of the metering chamber, a preferably removable closure having a pouring lip is provided. The removable chamber closure is formed with a valve seat for a purpose to be made hereinafter more apparent. In use the novel fluid dispenser is secured to the fluid supply container in place of the conventional cap closure after the container is filled with desired fluid. Thereafter pressure is applied to the fluid within the container, either by squeezing the sidewalls of the container where it is flexible walled, or by applying pressure to the liquid in any other conventional form. This pressure is accommodated by movement of the Cartesian diver valve upwardly into the tube. The upper limit of movement of the Cartesian diver valve is restricted by the valve seat, at which time the discharge orifice of the diver valve is in communication with the metering chamber permitting the passage of fluid from the reservoir through the tube, through the diver valve, and into the metering chamber. Upon release of pressure, the diver valve returns into the tube sealing the reservoir from communication with the metering chamber. The quantity of fluid in the metering chamber is then available for dispensing through the pouring lip of the chamber closure cap.

An important feature of the invention resides in the fabrication of the dispenser so that it may be substituted for the conventional screw-on cap of a screw-neck squeeze bottle thus minimizing production and assembly costs, and implementing utilization of the novel dispenser.

Another important feature of the invention resides in the fact that the fluid conduit readily lends itself to fabrication of any desired length to permit its use with bottles of different capacity.

The specific details of a preferred embodiment of the invention, and their mode of functioning will be made most manifest and particularly pointed out in clear concise and exact terms in conjunction with the accompanying drawings, wherein:

FIG. 1 is an elevational perspective view of the novel dispensing container with parts broken away to reveal the structural details of the novel Cartesian diver valve in position when no pressure is applied to the fluid in the reservoir; and FIG. 2 is a cross sectional elevational view of the novel dispensing container shown in FIG. 1 with the container shown squeezed to force the novel Cartesian diver valve to a position permitting fluid to pass from the reservoir into the metering chamber; and FIG. 3 is a cross sectional view of a modified embodiment of the novel Cartesian diver valve.

Referring now more particularly to the drawings, like numerals in the various figures will be employed to designate like parts.

As best seen in FIGS. 1 and 2, the novel dispensing container 10 is formed with a liquid containing body portion in the form of a flexible walled fluid supply container 11. This container 11 is illustrated in the configuration of a narrow necked cylindrical squeeze bottle of conventional type formed of polystyrene, polyvinyl, or the like flexible plastic materials lending themselves to blow molding production. It will of course be apparent to those skilled in the art, however, that a relatively rigid walled container may be employed having a flexible bottom or flexible side portion permitting the application of pressure to the internal contents of the container, or that other pressure applying means may be employed to build up pressure in the container.

Within the container 11, a reservoir 12 is formed by the normal configuration of the container. A neck portion 14, externally threaded at 15, is provided at the top of the container in conventional fashion.

A novel dispensing and metering cap assembly 20 is provided as a closure for the container 10. This metering assembly 20 comprises a cylindrical fluid containing metering chamber 21 formed by the hollow interior of the assembly serving to confine a desired quantity of fluid for dispensing. An internally threaded neck engaging collar portion 22 is formed within this assembly dimensioned so as to permit screw threaded engagement with the threaded neck of the bottle. It will of course be apparent to those skilled in the art that in lieu of the threaded engagement between the metering assembly 20 and the container 11 a variety of other conventional fluid type couplings may be employed. Fluid conducting conduit 23 in the form of a tube extends downwardly from the metering chamber 21 with which it is coupled in fluid-tight relationship, into the container 11 is viewed in FIGS. 1 and 2. At the lower end of fluid conducting tube 23, a constriction providing a retaining rim 24 is formed either by swaging down the end of the tube, or by insertion of a retaining plug 25 as viewed in FIG. 2. This retaining lip or rim has an aperture slightly less than the diameter of the bore of the tube.

A chamber cap 30 is secured (preferably removably) to the top of the metering chamber 20 and is formed with a pouring aperture 31 having a pouring lip 32 surrounding same. Within the cap immediately beneath the pouring lip, a valve seat 33 is formed for a purpose to be made hereinafter more apparent.

Slidably mounted within the fluid conduit formed by tube 23 is a novel Cartesian diver valve 35 of a cylindrical configuration and having an external cross section permitting it to slide freely within the interior of cylindrical tube 23, but with a tight enough fit between the side walls of the interior of the tube and the exterior of the valve so that fluid of the type employed in the novel dispensing container 10 will not by-pass the valve. Valve 35 is of a hollow configuration with a closed top 36 and having a discharge port 37. The valve top 36 is shaped to seat on valve seat 33 as viewed in FIG. 2.

In the modified embodiment of the valve illustrated in FIG. 3, a stop 38 is extended from the top of the valve member permitting a reduction in its material, with stop 38 normally seating against valve seat 33 when it is substituted for the embodiment of the invention illustrated in FIG. 1. This FIG. 3 valve type is contemplated for use in connection with relatively large metering chambers where the height of the chamber is such as to provide a distance between the valve seat and the conduit top larger than the normally required valve dimension.

OPERATION

The invention has been here disclosed in connection with a conventional cylindrical squeeze bottle type container. It will however be apparent to those skilled in the art that the shape or type of the container may be varied without departing from the scope of this invention. Thus the flexible walled squeeze bottle type container here illustrated may be substituted by a container having at least one flexible area permitting external pressure to be applied to the fluid contained within the container, or other pressure applying structures may be utilized to build up liquid pressure in the container.

In use, the container is filled with the desired fluid and the metering assembly 20 is secured on the container in place of the conventional cap closure. The invention has been embodied in connection with a screw capped bottle, but other conventional container closures may be replaced by the metering assembly with its collar 22 modified in accordance with the closure replaced.

When it is desired to dispense a given quantity of fluid, the side walls of the container are squeezed to the position shown in FIG. 2, to apply pressure to the fluid contained within the container. As a result of this application of pressure, Cartesian diver valve 35 will be moved upwardly within fluid conducting tube 23 thus accommodating the pressure within the container. When valve 35 has reached its upwardly limited position against valve seat 33, port 37 is positioned over the top of tube 23 in communication with metering chamber 21 and the fluid within the container will flow through port 37 into fluid confining metering chamber 21, until the metering chamber is filled to confine a desired quantity of fluid for dispensing, at which time the application of pressure to the side walls of the container will not produce further fluid flow since a pressure equilibrium condition prevails.

When the user feels no further flexing of the side walls of the container in response to pressure applied, the metering chamber will be known to be filled. Thereupon release of pressure on the container 11 establishes a drop in pressure in the reservoir 12, drawing diver valve 35 down into tube 23, closing off fluid communication between the reservoir 12 and chamber 21. Inversion of the container will then permit dispensing from the pouring orifice 31 of the given quantity of fluid contained in the metering chamber 21. Further flow of fluid from the reservoir 12 within container 11 is prevented as a result of the fluid tight connection between valve 35 and the side walls of the interior of tube 23.

It is thus seen that a novel dispensing container has been provided in which by the simple expedient of replacing the conventional container closure by a novel metering chamber assembly a given quantity of fluid may be dispensed at will. The components are readily fabricatable of conventional plastics by conventional plastic forming techniques and lend themselves to inexpensive effective production and distribution.

The above disclosure has been given by way of illustration and elucidation and not by way of limitation, and it is desired to protect all embodiments of the herein-disclosed inventive concept within the scope of the appended claims.

What is claimed is:

1. Fluid dispensing means permitting the flow of a given desired metered quantity of fluid, said means comprising: metering means confining a given desired quantity of fluid for dispensing, said metering means provided with liquid pouring means; fluid conducting means in communication with said metering means; a fluid supply source from which fluid may be supplied through said conducting means to said metering means; and valve means movable in said fluid conducting means in response to the pressure of the fluid in said fluid supply means to permit the flow of fluid to said metering means upon an increase in pressure in said fluid supply source to a given level, and a cessation of fluid flow to said metering means upon the attainment of equal pressures in said metering means and said supply means, whereby a desired quantity of fluid will be confined in said metering means for dispensing.

2. Fluid dispensing means as in claim 1 in which fluid flow path means are provided through said valve means, said flow path means being open to said metering means only when given pressures obtain in the fluid in said supply source.

3. Fluid dispensing means as in claim 1 in which seat means are formed adjacent said metering means limiting the movement of said valve means.

4. A fluid metering dispenser for use with a liquid container having means for applying pressure to the liquid contained therein, said dispenser comprising: an elongate tube extending to a point short of the bottom of the container; a metering chamber in fluid communication with said tube, said chamber having a pouring aperture formed therein; and a valve member slidably mounted in said tube and of a cross-sectional dimension preventing fluid flow between the interior of the tube sidewall and the valve surface, said valve having a discharge port through which fluid may flow when the port is moved into fluid communication with said chamber.

References Cited by the Examiner

UNITED STATES PATENTS

| | | | |
|---|---|---|---|
| 1,301,229 | 4/19 | Coker | 222—492 X |
| 2,730,272 | 1/56 | Ellis | 222—207 X |
| 3,094,250 | 6/63 | Molyneaux et al. | 222—207 |

LOUIS J. DEMBO, *Primary Examiner.*